(12) United States Patent
Mooney (10) Patent No.: US 11,312,309 B1
(45) Date of Patent: Apr. 26, 2022

(54) VEHICLE-MOUNTED GARMENT DRYING RACK

(71) Applicant: Henry Mooney, Ojai, CA (US)

(72) Inventor: Henry Mooney, Ojai, CA (US)

( * ) Notice: Subject to any disclaimer, the term of this patent is extended or adjusted under 35 U.S.C. 154(b) by 129 days.

(21) Appl. No.: 16/821,884

(22) Filed: Mar. 17, 2020

Related U.S. Application Data (60) Provisional application No. 62/820,195, filed on Mar. 18, 2019.

(51) Int. Cl.
   *B60R 7/10* (2006.01)
   *B60R 7/04* (2006.01)

(52) U.S. Cl.
   CPC . *B60R 7/10* (2013.01); *B60R 7/04* (2013.01)

(58) Field of Classification Search
   CPC .. B60R 7/10; B60R 7/04; B60R 9/048; B60R 9/052
   See application file for complete search history.

(56) References Cited

U.S. PATENT DOCUMENTS

| | | | | |
|---|---|---|---|---|
| 3,226,147 A | * | 12/1965 | Marshall | A47G 25/1457 294/99.1 |
| 3,403,787 A | * | 10/1968 | Browning | A47B 61/003 211/124 |
| 4,262,834 A | * | 4/1981 | Nutt | B60R 9/0485 182/127 |
| 4,456,158 A | * | 6/1984 | Wertz | B60R 9/12 224/316 |
| 4,603,798 A | | 8/1986 | Griswold | |
| 4,681,247 A | | 7/1987 | Prosen | |
| 4,856,661 A | | 8/1989 | Guillen | |
| 4,997,000 A | | 3/1991 | Feast | |
| 5,139,298 A | * | 8/1992 | Dowell | A47G 25/145 206/279 |
| 5,292,045 A | | 3/1994 | Mandel | |
| 5,582,304 A | | 12/1996 | Dishon, Jr. | |
| 5,673,889 A | | 10/1997 | DeValcourt | |
| 5,769,292 A | | 6/1998 | Cucheran | |
| 6,679,673 B1 | | 1/2004 | Stabler | |
| 8,225,525 B1 | | 7/2012 | Gallagher | |
| 9,290,133 B1 | * | 3/2016 | Bishop | A47F 5/0884 |
| 2009/0308902 A1 | | 12/2009 | Rex | |
| 2013/0193176 A1 | | 8/2013 | Khoo | |
| 2014/0097219 A1 | | 4/2014 | Reiber | |
| 2014/0131405 A1 | | 5/2014 | Noonan | |
| 2014/0143990 A1 | * | 5/2014 | Sautter | B60R 9/04 24/68 CD |

(Continued)

*Primary Examiner* — Brian D Nash
(74) *Attorney, Agent, or Firm* — Quickpatents, LLC; Kevin Prince (57) ABSTRACT

A rack for holding a wet garment, such as a neoprene wetsuit, to a vehicle for drying while the vehicle is in motion includes two or more mounts each adapted for removably attaching to the vehicle. A standoff is fixed with an upper side of each mount. A pair of elongated jaws comprise a lower jaw and an upper jaw. The lower jaw is fixed with forward and rear brackets. The upper jaw is pivotally attached to the forward bracket and can move between open and closed positions. The forward and rear brackets are fixed with the upper ends of each standoff. A rear bracket is adjustable forward to backward on the lower jaw so as to adapt to the vehicle roof rack of the vehicle. A locking mechanism is adapted to maintain the jaws in the closed position.

11 Claims, 5 Drawing Sheets

(56) References Cited

U.S. PATENT DOCUMENTS

| | | | |
|---|---|---|---|
| 2017/0267187 A1* | 9/2017 | Rarey | B60R 9/048 |
| 2017/0362768 A1 | 12/2017 | Molina Sanchez | |
| 2018/0080168 A1 | 3/2018 | Kelly | |
| 2018/0265013 A1* | 9/2018 | Beznes | A01K 97/10 |
| 2019/0297781 A1* | 10/2019 | Palmer | A01F 25/12 |
| 2021/0129763 A1* | 5/2021 | Schwartz | B60R 9/058 |

* cited by examiner

VEHICLE-MOUNTED GARMENT DRYING RACK

CROSS-REFERENCE TO RELATED APPLICATIONS

This application claims the benefit of U.S. Provisional Patent Application 62/820,195, filed on Mar. 18, 2019, and is incorporated herein by reference.

STATEMENT REGARDING FEDERALLY SPONSORED RESEARCH AND DEVELOPMENT

Not Applicable.

FIELD OF THE INVENTION

This invention relates to vehicle racks, and more particularly to a vehicle-mounted garment drying rack.

BACKGROUND

Vehicle racks are known in the art for carrying various items such as bicycles, surfboard, luggage, skis and the like. For surfers in particular, it is often the case in colder climates that after surfing a wet wetsuit must be transported. A wet wetsuit is a nuisance because it dampens whatever it touches, including items in a trunk or a back seat, and can ruin vehicle upholstery.

Garment racks for mounting to vehicles are known, but they are not intended to hold garments while the vehicle is moving. As such, these types of prior art devices would be suitable for holding a wetsuit to the outside of a vehicle, but would not help the wetsuit dry since the rack would have to be removed before driving.

Therefore, there is a need for a device that can hold a wetsuit or other garment outside of a vehicle to dry the garment while the vehicle is moving. Such a needed device would be easy to mount to the vehicle and would allow for locking of the garment to the device for security. Such a needed invention would be relatively simple and inexpensive to manufacture. The present invention accomplishes these objectives.

SUMMARY OF THE INVENTION

The present device is a rack for holding a wet garment, such as a neoprene wetsuit, to a vehicle for drying while the vehicle is in motion. Wind blows around the garment while the vehicle is in motion to quickly dry the garment.

Two or more mounts are each adapted for removably attaching to the vehicle at a lower side of the mount. Each mount may be adapted to be affixed, for example, with a vehicle roof rack. A rigid standoff is fixed at a lower end thereof with an upper side of each mount. Each standoff has an upper end disposed above the mount, and is preferably at least eight inches tall so that wind can get under the garment to dry the garment.

A pair of elongated jaws comprise a lower jaw and an upper jaw. The lower jaw is fixed at a forward end thereof with a forward bracket. The upper jaw is pivotally attached at a front end thereof to the forward bracket and disposed above and aligned with the lower jaw. As such, the jaws are substantially aligned and parallel when the jaws are in a closed position. The upper jaw is pivotable upward and away from the lower jaw to achieve an open position. The forward bracket is fixed with the upper ends of each standoff.

Preferably a rear bracket is included and fixed with the lower jaw and at least one of the mounts and standoffs. Preferably the lower jaw includes a longitudinal slot, and the rear bracket is fixed with at least one mounting pin through the longitudinal slot, such that the mount, standoff, and rear bracket are adjustable forward to backward on the lower jaw so as to adapt to the vehicle roof rack of the vehicle.

A locking mechanism is adapted to maintain the jaws in the closed position. The locking mechanism may be a spring fixed within the upper jaw around a pivot pin of the forward bracket. The spring urges the upper jaw into the closed position. Alternately the locking mechanism includes a U-shaped bolt adapted for selective placement into apertures of the back end of each jaw when the jaws are in the closed position. The locking mechanism may further include a combination or key lock so that the vehicle may be left alone, such as in a parking garage, the garment secured to the rack with theft of the garment inhibited by the locking mechanism.

In use, with each mount fixed with the vehicle, the upper jaw is lifted into the open position and the garment is placed between the jaws. The upper jaw is then lowered into the closed position and maintained therein with the locking mechanism. The garment is dried while the vehicle is in motion with the wind from the car's motion air-drying the garment.

The present invention is a device that can hold a wetsuit or other garment outside of a vehicle to dry the garment while the vehicle is moving. The present device is easy to mount to the vehicle and allows for locking of the garment to the device for security. The present invention is also relatively simple and inexpensive to manufacture. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
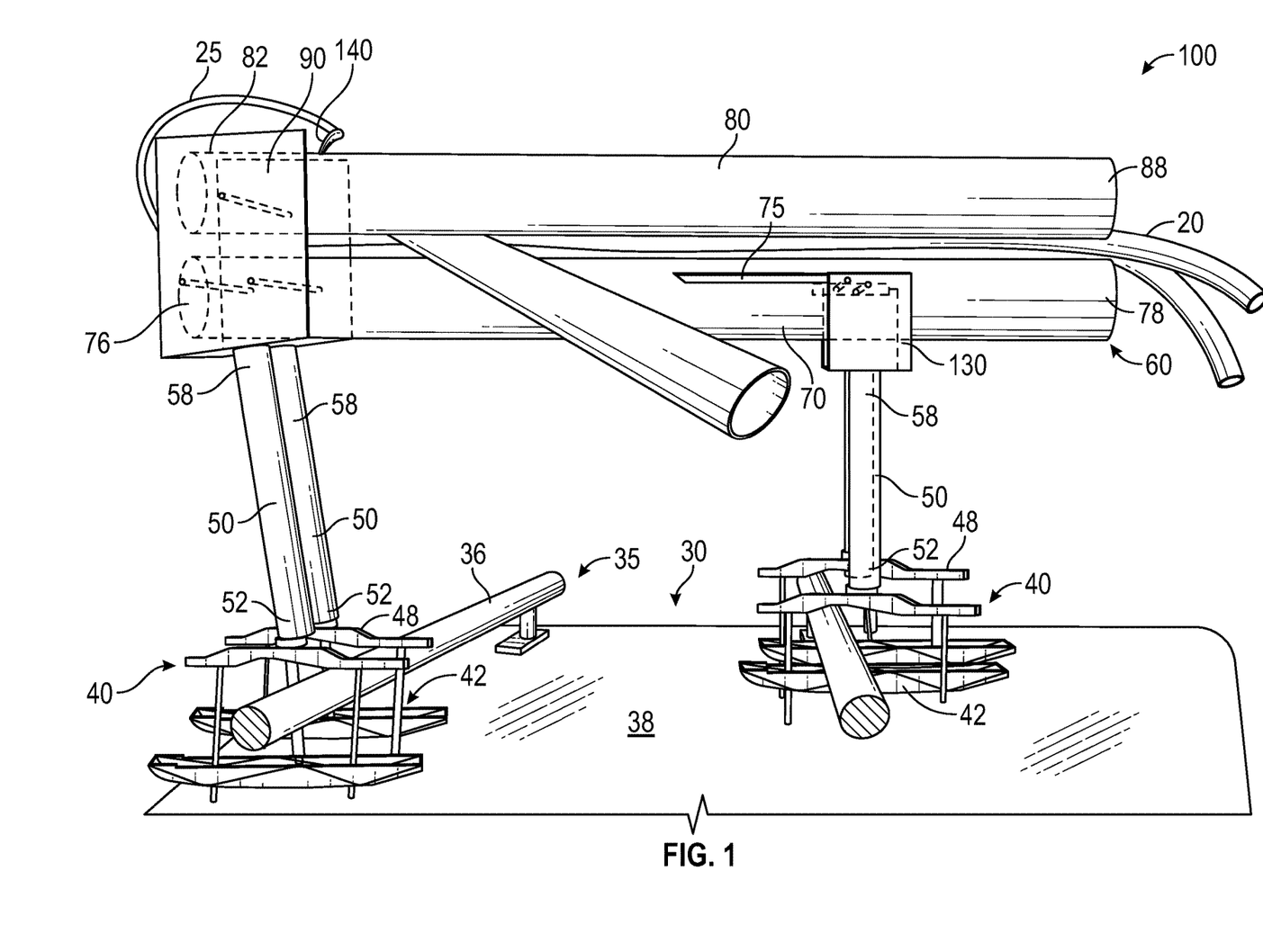
FIG. 1 is a side perspective view of the invention, illustrating jaws of the invention in a closed position capturing a garment therebetween.
Figure 2:
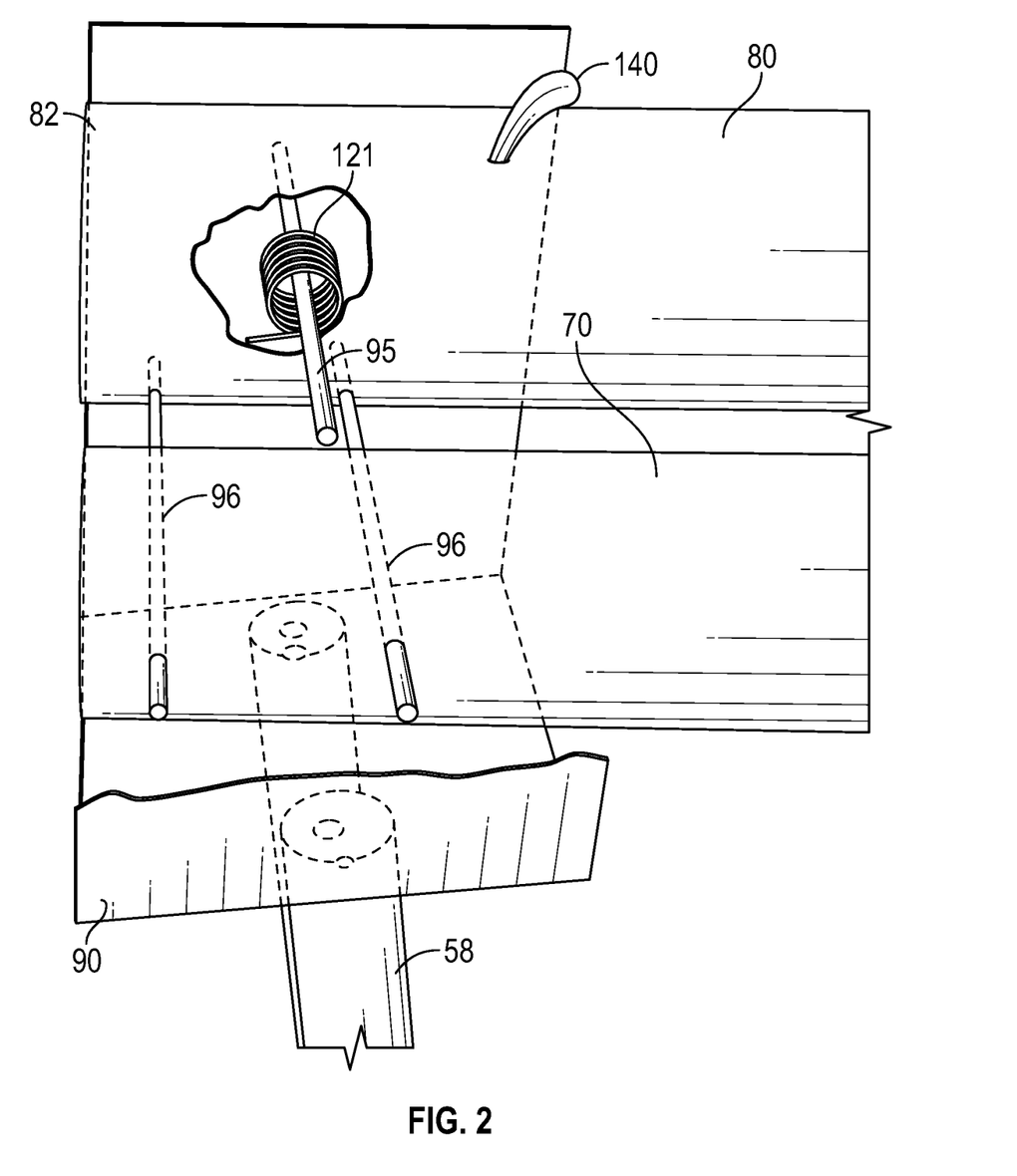
FIG. 2 is an enlarged perspective view, partially cut-away, illustrating a locking mechanism of the jaws.
Figure 3:
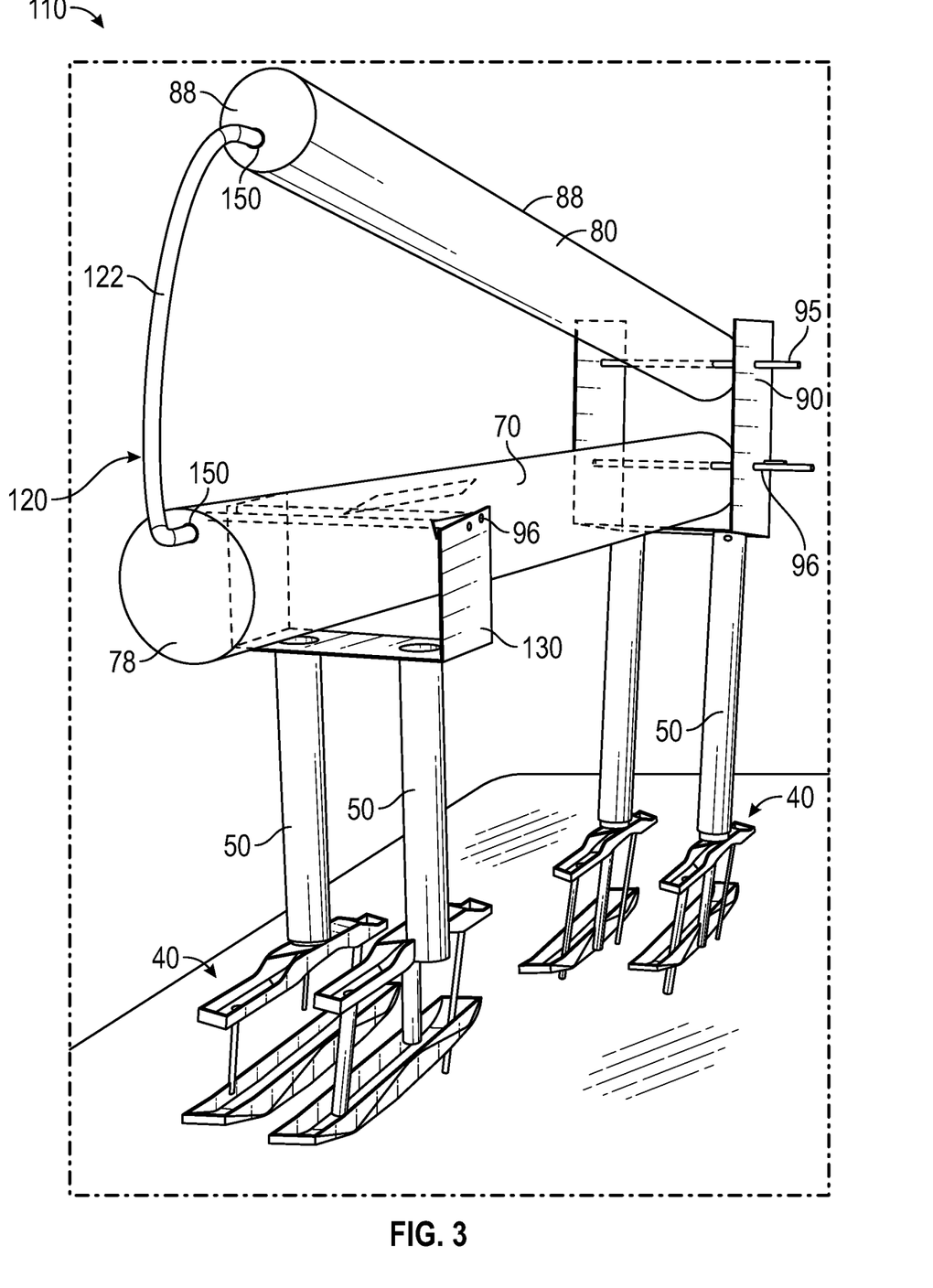
FIG. 3 is a rear perspective view of the invention, illustrating the jaws in an open position.

FIGS. 1-3 illustrate a rack 10 for holding a wet garment 20, such as a neoprene wetsuit 20, to a vehicle 30 for drying while the vehicle 30 is in motion. Wind blows around the garment 20 while the vehicle 30 is in motion to quickly dry the garment 20.

Two or more mounts 40 are each adapted for removably attaching to the vehicle 30 at a lower side 42 of the mount 40. Each mount 40 may be adapted to be affixed, for example, with a vehicle roof rack 35 having lateral beams 36 raised above a roof 38 of the vehicle 30 (FIG. 1). Alternately, each mount 40 may include a high-friction pad and a strap (not shown) for locking into doors of the vehicle. Alternately each mount 40 may include a suction cup (not shown) fixe with the lower side 42 of the mount 40. As such, the art is replete with different types of A rigid standoff 50 is fixed at a lower end 52 thereof with an upper side 48 of each mount 40. Each standoff 50 has an upper end 58 disposed above the mount 40, and is preferably at least eight inches tall so that wind can get under the garment 20 to dry the garment 20, and to prevent the garment 20 from contacting the vehicle 30.

Figure 4:
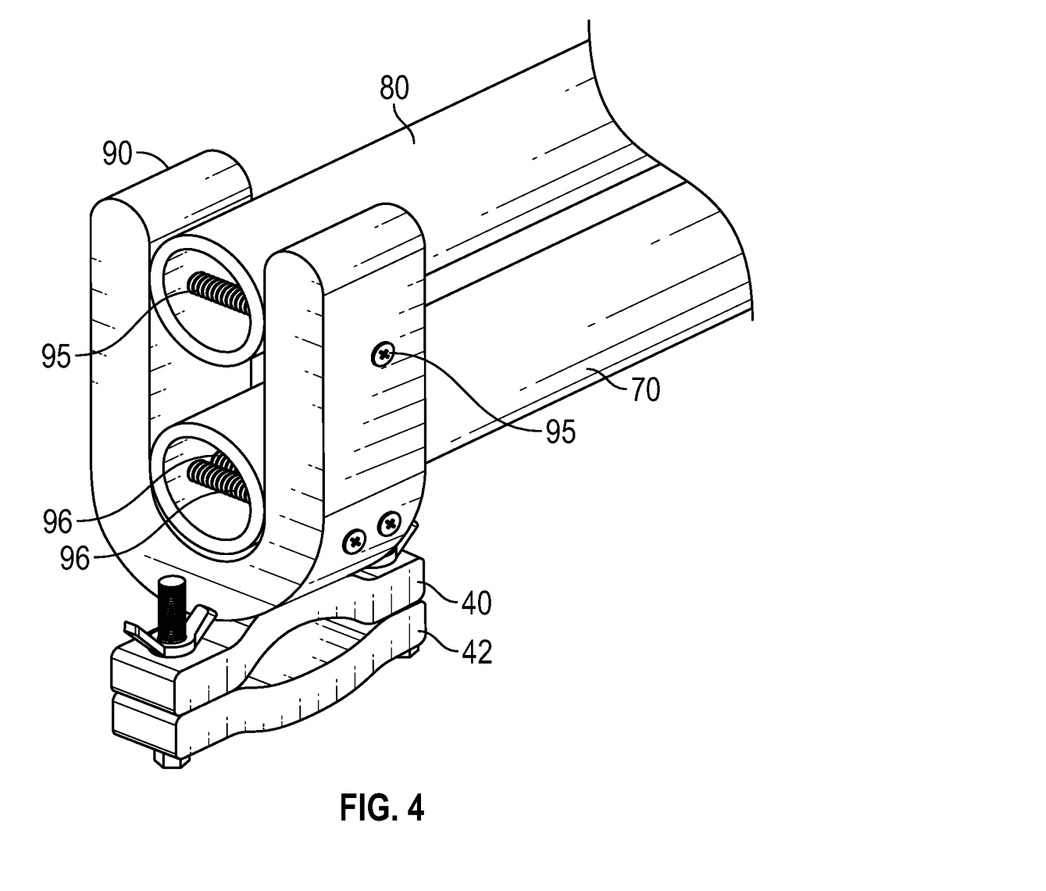
FIG. 4 is an enlarged partial front view of an alternate embodiment of the invention.

A pair of elongated jaws 60 comprise a lower jaw 70 and an upper jaw 80. The lower jaw 70 is fixed at a forward end 72 thereof with a forward bracket 90 (FIGS. 2 and 4). The upper jaw 80 is pivotally attached at a front end 88 thereof to the forward bracket 90 and disposed above and aligned with the lower jaw 70. As such, the jaws 70,80 are substantially aligned and parallel when the jaws 70,80 are in a closed position 100 (FIG. 1). The upper jaw 80 is pivotable upward and away from the lower jaw 70 to achieve an open position 110 (FIG. 3). The jaws 70,80 each include a back end 78,88 (FIG. 3) and preferably all sides of each jaw 70,80 are smooth and rounded, with no sharp edges that could snag the garment 20. The forward bracket 90 is fixed with the upper ends 58 of each standoff 50. Each jaw 70,80 may be made from a rigid or semi-rigid material such as plastic, wood, or the like.

Figure 5:
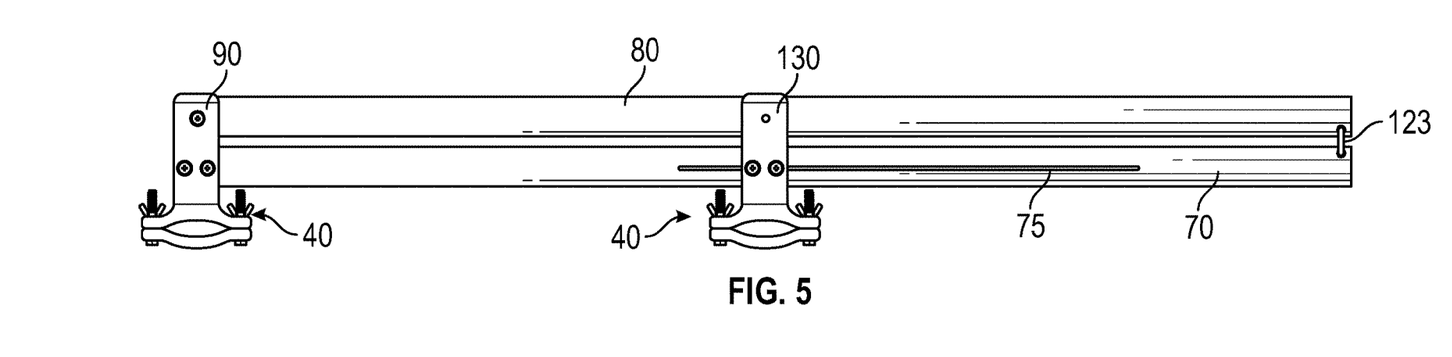
FIG. 5 is a side elevational view of the embodiment of FIG. 4.

Preferably a rear bracket 130 is included and fixed with the lower jaw 70. The rear bracket 130 is fixed with at least one of the mounts 40 and standoffs 50, similarly to the front bracket 90. Preferably the lower jaw 70 includes a longitudinal slot 75 (FIGS. 1 and 5), and the rear bracket 130 is fixed with at least one mounting pin 96 through the longitudinal slot 75, such that the mount 40, standoff 50, and rear bracket 130 are adjustable forward to backward on the lower jaw 70 so as to adapt to the vehicle roof rack 35 of the vehicle 30. Preferably the forward bracket 90 is fixed with two of the mounts 40 and two of the standoffs 50, and likewise the rear bracket 130 is preferably fixed with two of the mounts 40 and two of the standoffs 50. Preferably each bracket 90,130 is made from a rigid metal or plastic material.

Figure 6:
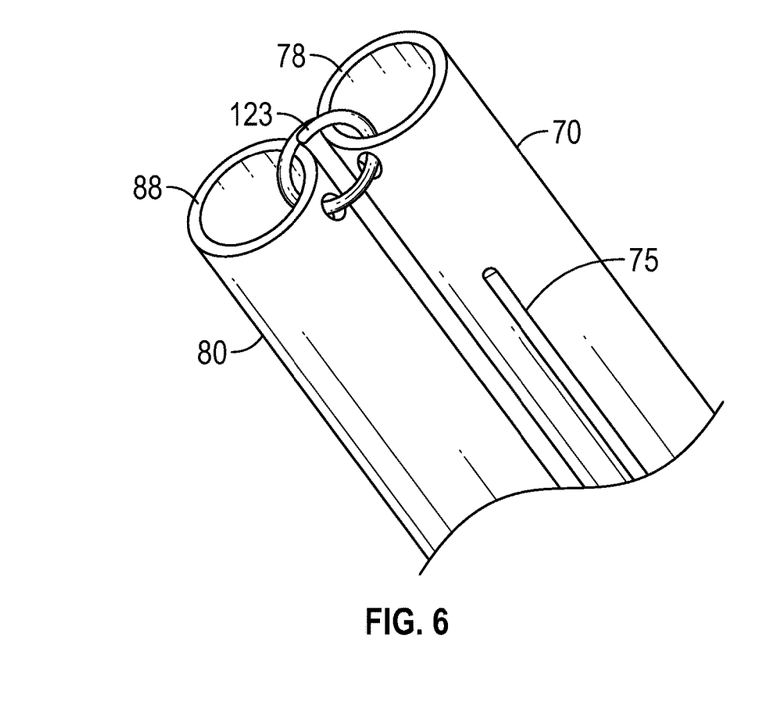
FIG. 6 is an enlarged partial rear view of the embodiment of FIG. 4.

A locking mechanism 120 is adapted to maintain the jaws 70,80 in the closed position 100. The locking mechanism 120 may be a spring 121 fixed within the upper jaw 80 around a pivot pin 95 of the forward bracket 90 (FIG. 2). The spring 121 urges the upper jaw 80 into the closed position 100. Alternately the locking mechanism 120 includes a U-shaped bolt 122 (FIG. 3) or ring or strap 123 (FIGS. 3 and 6) adapted for selective placement into apertures 150 of the back end 78,88 of each jaw 70,80 when the jaws 70,80 are in the closed position 100. The locking mechanism 120 may further include a combination or key lock (not shown) so that the vehicle 30 may be left alone, such as in a parking garage, the garment 20 secured to the rack 10 with theft of the garment 20 inhibited by the locking mechanism 120.

In use, with each mount 40 fixed with the vehicle 30, the upper jaw 80 is lifted into the open position 110 and the garment 20 is placed between the jaws 70,80. The upper jaw 80 is then lowered into the closed position 100 and maintained therein with the locking mechanism 120. The garment 20 is dried while the vehicle 30 is in motion with the wind from the car's motion air-drying the garment 20.

In some embodiments, the upper jaw 80 includes a hood hook 140 proximate the forward end 82 thereof. A hood 25 of the garment 20 can be placed between the jaws 70,80 with the hood 25 extending beyond the forward ends 72,82 of the jaws 70,80 and looped over the upper jaw 80 to hook onto the hood hook 140. This further secures the garment 20 to the rack 10.

While a particular form of the invention has been illustrated and described, it will be apparent that various modifications can be made without departing from the spirit and scope of the invention. For example, the mounts 40 and standoffs 50 shown in the figures may be modified to a more streamlined design that promotes air flow around the garment 20. Further, the brackets 90, 130 and the jaws 70,80 are preferably made with no sharp corners or edges to tear the garment 20. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A rack for holding a wet garment to a vehicle for drying, comprising:
   two or more mounts, each mount adapted for removably attaching to the vehicle at a lower side of the mount;
   a standoff fixed at a lower end thereof with an upper side of each mount, each standoff having an upper end disposed above the mount;
   a pair of elongated jaws comprising a lower jaw and an upper jaw, the lower jaw fixed at a forward end thereof with a forward bracket, and the upper jaw pivotally fixed at a front end thereof with the forward bracket above the lower jaw, such that the elongated jaws are substantially aligned and parallel when the jaws are in a closed position, the upper jaw being pivotable upward away from the lower jaw to achieve an open position, the forward bracket fixed with the upper ends of each standoff, each jaw having a back end;
   a locking mechanism adapted to maintain the jaws in the closed position;
   a rear bracket fixed with the lower jaw, the rear bracket fixed with at least one of the mounts and standoffs, the lower jaw including a longitudinal slot, the rear bracket fixed with the lower jaw adapted to slidably engage the slot so that the position of the mounts on the vehicle is adjustable;
   where each mount fixed with the vehicle, the upper jaw can be lifted into the open position and the garment placed between the jaws, the upper jaw then lowered into the closed position and maintained therein with the locking mechanism, the garment being dried while the vehicle is in motion.

2. The rack of claim 1 wherein each mount is adapted to be affixed with a vehicle roof rack having lateral beams raised above a roof of the vehicle.

3. The rack of claim 1 wherein each standoff is at least 8 inches tall.

4. The rack of claim 1 wherein the forward bracket is fixed with two of the standoffs and two of the mounts, and wherein the rear bracket is fixed with two of the standoffs and two of the mounts.

5. The rack of claim 1 wherein the jaws are each rounded and substantially smooth.

6. The rack of claim 1 further including a hood hook fixed with the upper jaw proximate the forward end thereof, whereby a garment with a hood can be placed between the jaws, the hood extending beyond the forward end of each jaw and looped over the upper jaw to hook on the hood hook, to further secure the garment within the rack.

7. The rack of claim 1 wherein the locking mechanism is a spring fixed within the upper jaw around a pivot pin of the forward bracket, the spring urging the upper jaw into the closed position.

8. The rack of claim 1 wherein the locking mechanism is a U-shaped bolt adapted for selective placement into apertures of the back end of each jaw when the jaws are in the closed position.

9. A rack for holding a wet garment to a vehicle for drying, the vehicle having a roof with a vehicle roof rack, the rack comprising:
   two or more mounts, each mount adapted for removably attaching to the vehicle at a lower side of the mount, each mount adapted to be affixed with a vehicle roof rack having lateral beams raised above a roof of the vehicle;
   a standoff fixed at a lower end thereof with an upper side of each mount, each standoff having an upper end disposed above the mount and being at least eight inches tall;
   a pair of elongated, rounded and smooth jaws comprising a lower jaw and an upper jaw, the lower jaw fixed at a forward end thereof with a forward bracket, and the upper jaw pivotally fixed at a forward end thereof with the forward bracket above the lower jaw, such that the elongated jaws are substantially aligned and parallel when the jaws are in a closed position, the upper jaw being pivotable upward away from the lower jaw in an open position, the forward bracket fixed with the upper ends of each standoff, each jaw having a back end;
   a rear bracket fixed with the lower jaw, the rear bracket fixed with at least one of the mounts and standoffs;
   the forward bracket fixed with two of the standoffs and two of the mounts, the rear bracket fixed with two of the standoffs and two of the mounts;
   a locking mechanism adapted to maintain the jaws in the closed position;
   the lower jaw including a longitudinal slot, the upper end of the standoffs fixed with the rear bracket adapted to slidably engage the slot so that the position of the mounts on the vehicle is adjustable;
   a hood hook fixed with the upper jaw proximate the forward end thereof;
   where each mount fixed with the vehicle, the upper jaw can be lifted into the open position and the garment placed between the jaws, the hood of the garment extending beyond the forward end of each jaw and looped over the upper jaw to hook on the hood hook, to further secure the garment within the rack, the upper jaw then lowered into the closed position and maintained therein with the locking mechanism, the garment being dried while the vehicle is in motion.

10. The rack of claim 9 wherein the locking mechanism is a spring fixed within the upper jaw around a pivot pin of the forward rack, the spring urging the upper jaw into the closed position.

11. The rack of claim 9 wherein the locking mechanism is a U-shaped bolt adapted for selective placement into apertures of the back end of each jaw when the jaws are in the closed position.

\* \* \* \* \*